United States Patent [19]

Gorog

[11] Patent Number: 4,947,028

[45] Date of Patent: Aug. 7, 1990

[54] AUTOMATED ORDER AND PAYMENT SYSTEM

[75] Inventor: Jonathan M. Gorog, Falls Church, Va.

[73] Assignee: Arbor International, Inc., Vienna, Va.

[21] Appl. No.: 221,536

[22] Filed: Jul. 19, 1988

[51] Int. Cl.⁵ .............................................. G06F 1/08
[52] U.S. Cl. .................................. 235/381; 235/380; 235/383; 235/472
[58] Field of Search ............... 235/380, 383, 381, 472; 902/22

[56] References Cited

U.S. PATENT DOCUMENTS

| | | | |
|---|---|---|---|
| 3,292,489 | 8/1964 | Johnson et al. | 88/24 |
| 3,668,312 | 6/1972 | Yamamoto et al. | 178/6.8 |
| 4,115,870 | 9/1978 | Lowell | 364/900 |
| 4,329,684 | 5/1982 | Monteath et al. | 340/707 |
| 4,415,065 | 11/1983 | Sanostedt | 186/39 |
| 4,471,218 | 9/1984 | Culp | 235/472 |
| 4,516,016 | 5/1985 | Kodron | 235/472 |
| 4,525,624 | 6/1985 | Pontefaact | 235/383 |
| 4,578,572 | 3/1986 | Hice | 235/472 |
| 4,608,487 | 8/1986 | Awane et al. | 235/383 |
| 4,621,189 | 9/1986 | Kumar et al. | 235/472 |
| 4,621,259 | 9/1986 | Schepers et al. | 340/707 |
| 4,707,592 | 11/1987 | Warr | 902/22 |
| 4,752,676 | 6/1988 | Leonard | 235/493 |
| 4,812,628 | 3/1989 | Boston | 235/280 |
| 4,812,629 | 3/1989 | O'Neil | 235/383 |

*Primary Examiner*—Harold I. Pitts
*Attorney, Agent, or Firm*—Jon L. Roberts

[57] ABSTRACT

An automated order and payment system for use by consumers to rapidly order products and services from any location at which the consumer is present at the time of ordering. The system receives information about the products/services to be ordered by means of signals generated by scanning identification codes imprinted in advertising media or displayed to a consumer on a television screen. A special version of the invention is modified to accept voice command via a voice recognition means for those physically handicapped persons unable to perform manual data entry tasks. The consumer uses an optical scanning means embodied in the Order Computer Terminal to scan identification code associated with a company and identification codes associated with the products/services desired. This product and company information is stored in the Order Computer Terminal along with credit information retrieved from a plurality of storage means used on credit cards and subsequently transmitted when desired by the consumer to a Central Computer System. The Central Computer System simultaneously receives information from multiple order computer terminals and verifies that the products or services from the desired company are in fact available. The Central Computer System also verifies the credit worthiness of the consumer by searching for such information from credit data bases. When the Central Computer System determines that the desired products/services are available and that the consumer is credit worthy, an order verification signal is sent to the individual consumer's order computer terminal whereupon the consumer verifies that he/she wishes to order the products/services communicated to the central computer system. Once the consumer varifies the order, the automated order and payment systme places the order for the products/services desired and provides the appropriate credit reference to the supplier of the product/service. The automated order and payment system capabilities are more fully set forth herein.

14 Claims, 5 Drawing Sheets

ORDER COMPUTER TERMINAL "OCT"

CSS ORDER ACCEPTANCE PROCESS

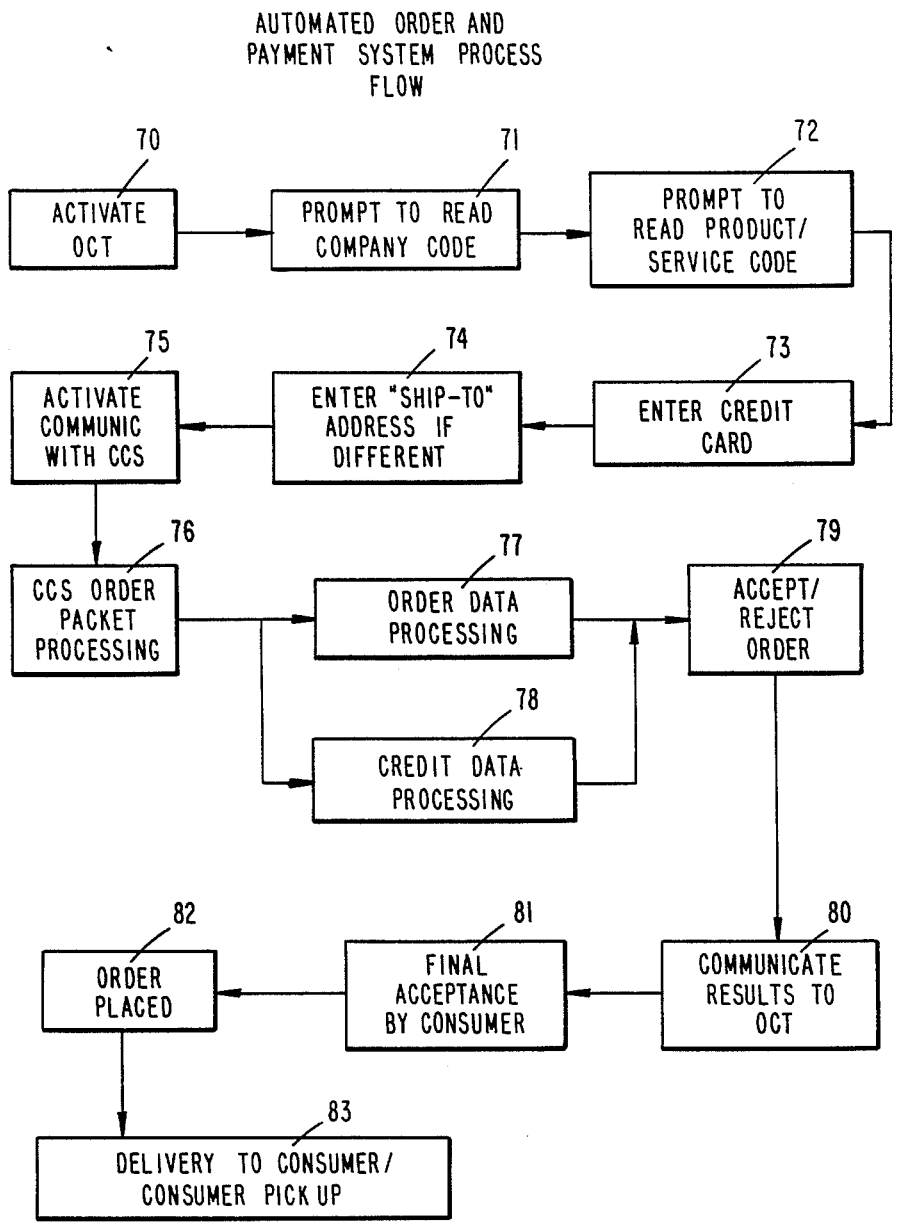

AUTOMATED ORDER AND PAYMENT SYSTEM

BACKGROUND OF THE INVENTION

1. Field of the Invention

This invention relates generally to automated order entry systems and more specifically to electronic communication of orders from a buyer to a seller of products/services.

The originality of the invention lies in the integration of existing devices, products and networks to accomplish a unique service which will make the process of buying and selling significantly more efficient. By using electronic communication technologies, this invention will allow the general public, including the visually and mobility handicapped, to place orders, and to pay for and receive merchandise and services, directly from their domiciles. Additionally, the same process will be used for merchant to merchant ordering and sales transactions.

2. Background

Several types of electronic data entry systems are described in issued patents. These fall into several classes. Certain data entry systems are caused to record data by an operator pressing a series of keys to allow the operator to enter alphanumeric data. Other such systems cause data to be entered through use of a manually scanned optical sensor. One such combination unit having both keyboard input and optical scanner input is described in Kumar et al. U.S. Pat. No. 4,621,189. Similarly, Hice U.S. Pat. No. 4,578,572 discloses an apparatus for personal identification which comprises a bar code printer and separate bar code reading apparatus connected to a portable keyboard data input device.

Other bar code reading devices have also been disclosed in issued U.S. Patents. In Schepers et al. U.S. Pat. No. 4,621,259 an optical bar code reader connected to a station selecting apparatus in a television set allows a user to select one particular station for viewing. In Sandstedt U.S. Pat. No. 4,415,065, an apparatus is disclosed containing an optical bar code reader attached to a portable micro-processor for rapid entry of orders in a restaurant or a retail vending facility. In Kodron U.S. Pat. No. 4,516,016, an apparatus is disclosed that is very similar to the Sandstedt invention for use in recording orders in restaurants that contains an optical bar code reader that is connected to a central processing unit for entry of restaurant orders. In Awane et al. U.S Pat. No. 4,608,487, a bar code reader is used to input information to automated vending machines. In Culp U.S. Pat. No. 4,471,218, a portable data entry terminal is disclosed containing an optical bar code reader and memory that subsequently transfers the data from the portable unit to a central computer.

Optical readers known as "light pens" have also been used to interact with cathode ray tubes ("CRT") to communicate with a central data base to indicate the selection of an option by a user. Yamamoto et al. U.S. Pat. No. 3,668,312, discloses a system whereby a party receiving a television image can use a light pen to indicate a selection of an option. This invention is used in the context of a telephone system. In Monteath et al. U.S. Pat. No. 4,329,684, a light sensing apparatus capable of sensing either a bar code or the light output in a particular area of a television screen to allow input of information to a central computer is disclosed. Johnson et al. U.S. Pat. No. 3,292,489, discloses a system for retrieving information from a database where data is displayed on a CRT with an associated optical code which is scanned by a hand-held optical sensor, which in turn provides information to a database for retrieval of the data required.

Portable data storage devices are also disclosed in issued U.S. patents. In Pontefract U.S. Pat. No. 4,525,624, a data storage device is disclosed that stores information for a salesman, while information is input via a key pad. At the close of each day, the stored data is transmitted via telephone to a central computer. Similarly, in Lowell U.S. Pat. No. 4,115,870, a hand-held data processing terminal is disclosed that stores data input via a key pad, which device also contains a data transmission circuit to allow information stored to be transmitted over telephone lines to a central computer. In summary, these patents all describe systems, each of which serves only a part of the entire retail cycle of customer demand, supplier filling that demand, payment for goods or services desired and delivery of those goods and services.

Many of the above patents describe systems which collect data and transfer data to a central data base. None of the patents describe data communication back from the central database to the data collection device in the same process. Additionally, none of the patents address the needs of the visually and mobility handicapped segment of the general public who cannot operate the devices described. Finally, none of the above patents describe a means to account for the credit needs of the public which are an integral part of the vast majority of the purchases made by consumers today.

SUMMARY OF THE INVENTION

The Automated Order and Payment System of this invention allows consumer transactions for goods and services to take place in a faster and more efficient manner than currently available thereby reducing the cost of selling such goods to consumers. The invention provides a simplified ordering system that eliminates the need for any order form to be filled out by the consumer. It further does not require the consumer to go to the place of sale in order to obtain the merchandise desired.

The system comprises three major components:

(a) A central computer system ("CCS") with a variety of programs, processing and storage capability and communications capabilities to allow input and output communications with order computer terminals.

(b) A product/service identification system consisting of symbols that are presented to the public via print and/or television media.

(c) A order computer terminal ("OCT") with means to input data orally, optically, magnetically, electronically, and manually having associated order processing software and communications capabilities allowing receipt of communications from the CCS and further providing output communications to the CCS.

The CCS can send data to or receive data from the OCT's or from other computer systems, for the purpose of accepting data transmitted from such terminals or other computers over normal telephone lines, radio, television, satellite, or any other signals from remote locations to the CCS. The CCS can also communicate with other computers using accepted industry protocols.

The CCS has various computer software programs that allow product/service order information to be accepted and transmitted from the central computer. Such software will also confirm or deny orders for products based upon records of inventories that have been provided by participating businesses or by sending a query to other computers holding the necessary data records for participating businesses. The CCS also confirms/denies the payment medium chosen by the consumer by communicating with third party systems such as credit card authorization systems or individual businesses.

Upon completion of order acceptance and confirmation of payment media, the confirmed order with associated information is sent to the consumer via the communications output means of the CCS. The confirmation information is received by the OCT via its internal communication means and displayed or printed for the consumer. If the order or payment is denied, the CCS sends a denial message to the OCT from the CCS communication means, which message is received by the OCT communication means Thus the OCT and the CCS communicate with each other via their two-way communications capability.

The invention operates through a series of identification codes that uniquely identify the company offering the product/service for sale and the individual product/service desired. Such identification codes may consist of, but are not limited to, bar codes which represent businesses and products/services being offered. These codes are printed in catalogs, magazines, newspapers and television advertisements, direct mail circulars, and any other medium that might communicate product information to consumers.

The OCT comprises data entry and storage and communication capabilities for use by the consumer. The consumer enters identifications data about the company from which he wishes to purchase products/services and data concerning the products/services to be purchased. This information is entered via an optical identification code reader which is manually scanned over an identification code. Information can also be entered manually via a key pad or orally via a voice recognition capability embodied in the OCT, which capability converts the human voice into digital data. The associated key pad or voice recognition capability also is used to input other information relating to the sale. The OCT also has the capability to read magnetic stripes, microchips, and optical storage media that are incorporated in credit cards using a plurality of means embodied in the OCT.

The OCT has a capacity to store orders from multiple companies and multiple orders from any given company.

A consumer uses the communications capacity of the OCT to transmit the order data via telephone lines, radio signal, or other communications lnks to the CCS. The OCT also has variable programming means such that it will prompt the user to enter data as required.

BRIEF DESCRIPTION OF THE DRAWING

FIGS. 2-7 illustrate various processing concepts within the system of FIG. 1.

DETAILED DESCRIPTION OF THE INVENTION

The automated order and payment system allows a consumer to place orders for goods and services through use of a order computer terminal ("OCT") that interacts with identification codes and voice commands that specifically identify companies and products/services, which codes appear in advertising media. The system allows rapid entry of orders for products and services without the consumer having to go to the location where such products and services are offered and with a minimum of consumer data entry. The invention consists of widely distributed OCTs and a central computer system ("CCS") that processes the orders and associated credit information that is sent to the CCS from the OCTs.

Through use of the OCTs, consumers rapidly enter information concerning the products and services desired with such information subsequently transmitted to the CCS for rapid processing and verification.

Figure 1:
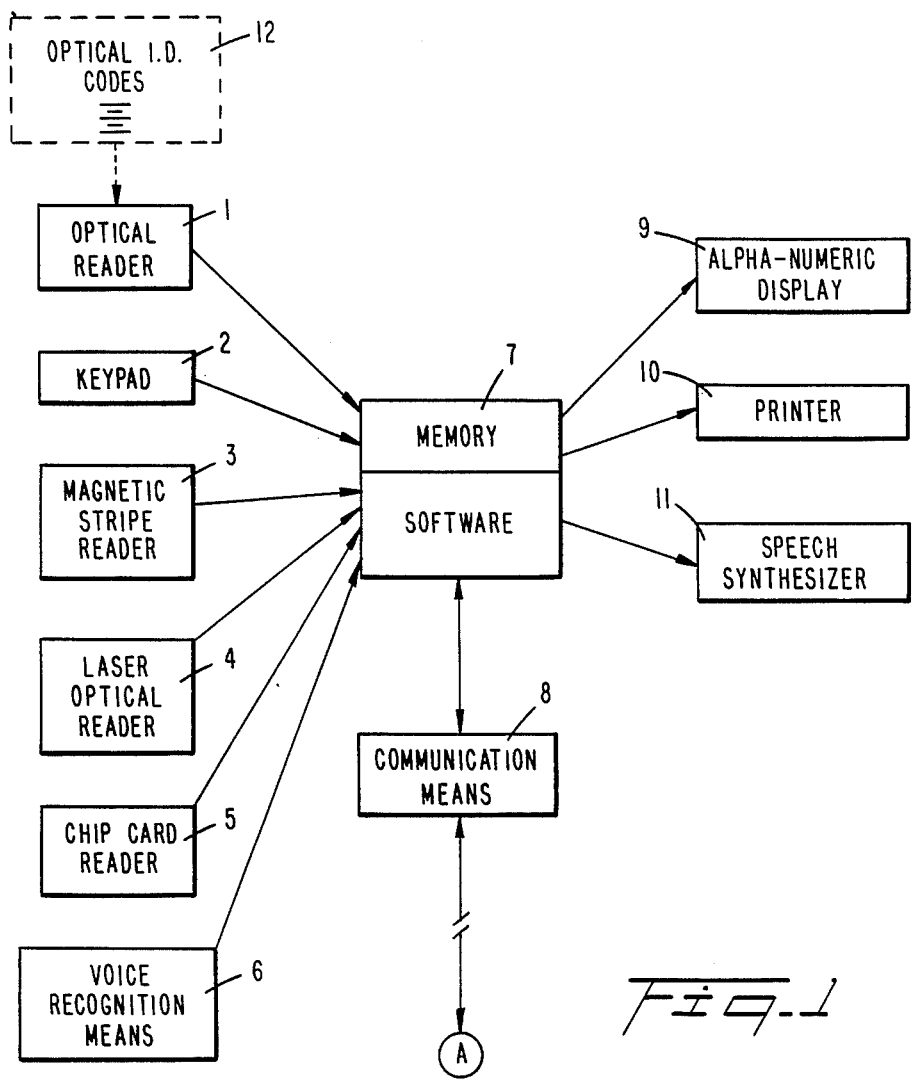
FIG. 1 illustrates the overall system structural arrangement.

Referring first to FIG. 1, the OCT consists of an optical reader [1] that a consumer scans across identification codes [12] that may appear in magazine, newspaper, catalog, and televisions advertisements. These codes identify the company providing the product/service, the product/service desired and the price code for the product/service. Information sensed by the optical reader is placed in the OCT memory [7].

The OCT contains an alpha numerical key pad [2] by which a consumer can enter data when necessary and which contains a key for initiating the order process and a key for verifying an order once all data processing concerning that order has been completed.

For special applications where a visually or mobility handicapped person used the system, the OCT contains a human voice recognition means and may also contain a speech synthesizing means. The voice recognition means translates voice commands into digital data that is processed and stored in memory. The voice synthesizing means is used in lieu of the visual display thereby prompting the user through the ordering and payment sequence.

The OCT also contains a magnetic reading capability [3] that allows a consumer to use the magnetic stripe on a credit card to directly input the information contained therein to the order entry system. In this manner, data can be rapidly entered concerning the credit information of a consumer.

The OCT also contains a laser optical reader [4] that optically reads stored data that may be present on a credit card. Such optical data may also contain consumer, and other identifying data.

The OCT also contains means to read the data stored in microchips embedded in credit cards [5]. Data stored in microchips will also contain certain consumer identification and credit card information necessary to complete purchase transactions.

The OCT also contains means to recognize the speech of an individual in order to enter data orally [6] for those handicapped persons unable to manually use a credit card.

The OCT also contains a communications means [8]. This interface allows the OCT to communicate with the CCS via telephone or other communications media (i.e. optical fiber networks, radio frequency transmissions, and satellite communications means). In this way, the OCT can rapidly send information without error to the CCS concerning the order information and information concerning the consumer's credit.

The OCT also has an alphanumeric display [9] that informs the consumer that the OCT is operating correctly, that the order has been accepted or rejected, and other information related to communication between the OCT and the CCS. Such information may also be printed via an integral printer means [10] or communicated to a handicapped individual via an integral speech synthesizing means [11].

Finally, the OCT contains both a memory capability and a capability to execute preprogrammed software [7]. This capability allows the OCT to store the software necessary to allow the OCT to interact with the consumer and the CCS. Further, the memory capability allows the OCT to store information presented to it by the optical reader, the key pad, the voice recognition system, the microchip reader, or the magnetic stripe reader which information relates to consumer identification data and to the goods or services desired for subsequent transmission via the communications interface to the CCS. Throughout this application, the credit and order data is referred to as the "order packet."

Figure 2:
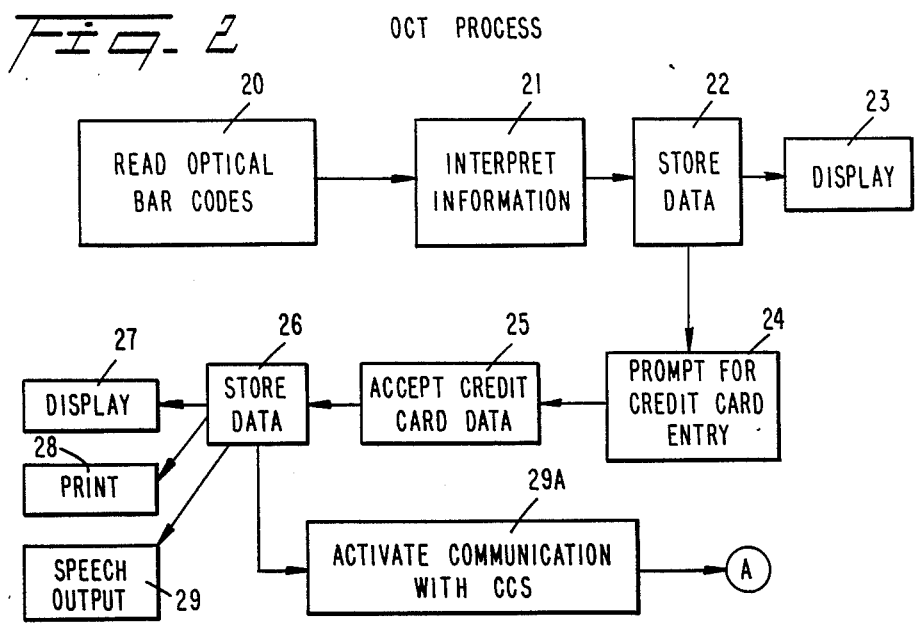

Referring to FIG. 2, The consumer uses the optical reading means of the OCT to read the optical identification codes [20] that are present in media advertising. The consumer first scans the identification code relating to the merchant or service provider. The consumer next scans the identification codes relating to the goods or services that the consumer desires to purchase.

In the case of a handicapped individual who cannot use the optical scanning means, the advertising data is input using the voice recognition means [6]. (Note: Throughout this specification, optical identification codes are exemplified as the input data. Data input capabilities of this inventions are in no sense so limited but should be viewed broadly. Indeed, it is a key aspect of this invention to provide alternative means of advertising and credit data input for those handicapped persons unable to handle a credit card or an optical identification code reader.)

In the situation where a handicapped consumer is ordering, that person will activate the OCT by a voice command and enter company data and product/service data orally. Company and product/service data will be presented to the handicapped public via media that has been customized to meet the specialized needs involved.

Software in the OCT interprets the optical identification code or orally input information [21] thereby obtaining company identification data, product or service identification data, and prices for the goods or services desired. After interpretation of this data, the information is stored [22] in the OCT memory and is either displayed [23] or confirmed by the voice synthesizer for the consumer.

After company, product and price data is entered, the OCT prompts the consumer to enter a credit card [24] to be used for the transaction. If handling a credit card is not possible for the handicapped person, credit data can be pre-stored in the OCT memory at the time the unit is provided to the handicapped person, thereby allowing such data to be transmitted without physically handling a credit card. The credit card data is accepted [25] and information is thereby acquired concerning the consumer's name, address, credit card number, type of credit card, and preferred delivery day, time and address for delivery. This information may be extracted from any of the various types of credit cards having integral data storage capability (i.e. chip card, laser optical card, magnetic card).

Data extracted and interpreted from the consumer's credit card is stored in the OCT memory [26] and displayed for the consumer [27] on the OCT alphanumeric display or printed as desired [28] or verified orally via the speech synthesizing means [29].

After all data is stored, the consumer activates the OCT communications means [8, 29A] that allows the OCT to communicate with the CCS concerning the proposed sale of goods or services. The OCT memory now contains credit authorization information, total purchase price, company identification, a list of the products/services desired, the consumer's name and address, the delivery address, and the date and time for delivery.

Figure 3:
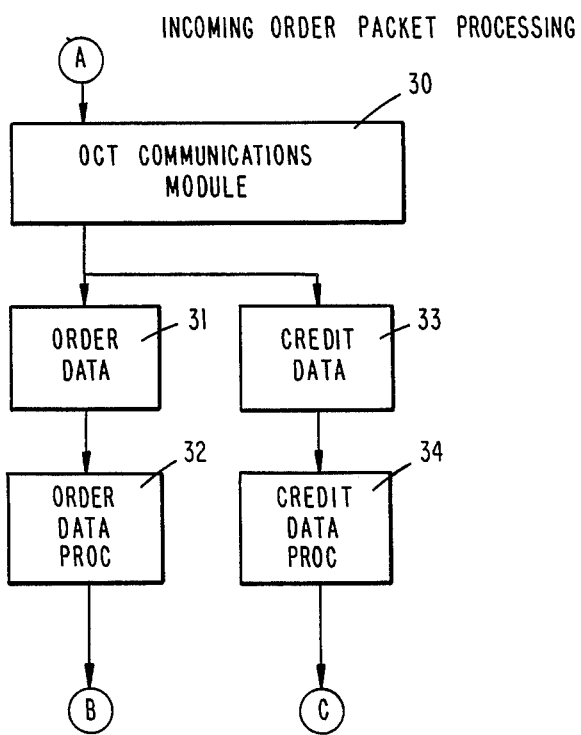

Referring to FIG. 3, the CCS receives the order packets over a variety of transmission media (e.g., telephone line, optical fiber transmission lines, satellite data link) from OCTs via the OCT communications module [30]. This module contains the hardware and software necessary to receive order and credit information from OCTs when a consumer sends such information. The incoming order packet process causes the order packet data to be divided into order data [31] that is, the information relating to the merchant, identification of the goods or services, and the amount of items desired. This information then is subjected to the order data processing software [32] of the CCS.

In a similar fashion, the credit data [33] is separated from the incoming order packet information. This credit data contains the credit authorization data and other information relevant to the credit card in use, and the total price of the goods or services desired. This information is then subjected to the credit data process [34] of the CCS.

Figure 4:
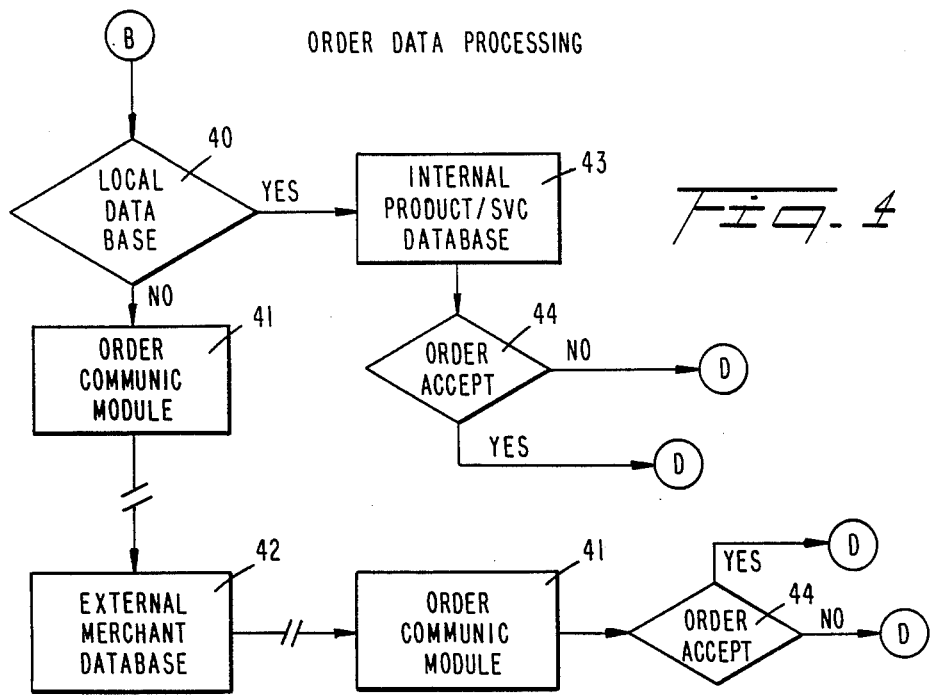
Figure 6:
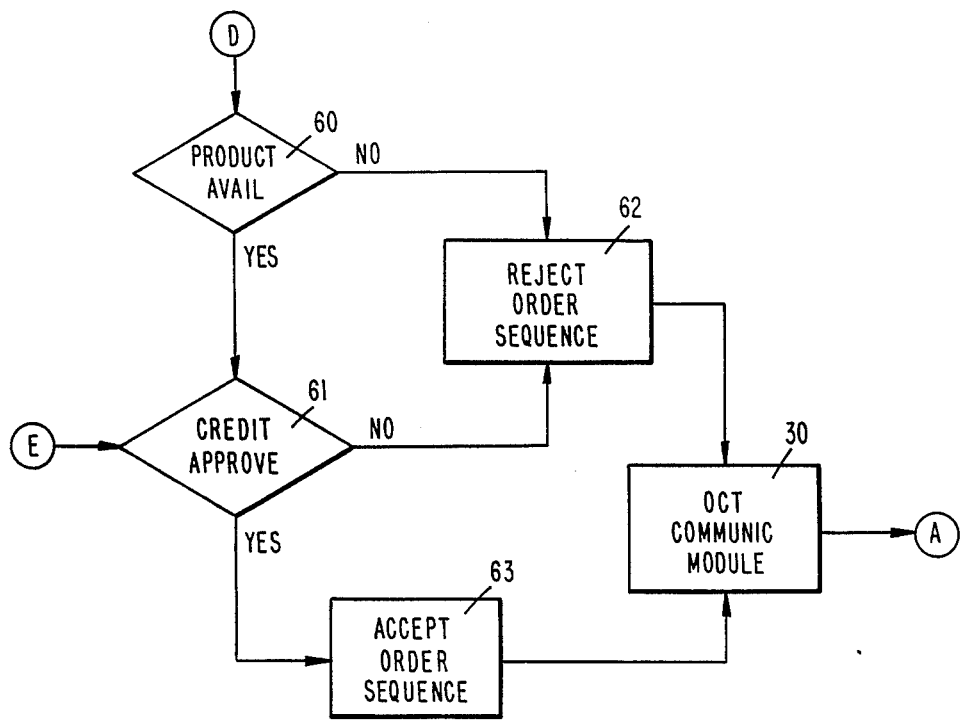

Referring next to FIG. 4, the CCS takes the order data information and determines if the order data may be further processed by using a local database internal to the CCS, or if the CCS must send such data to external merchant/supplier databases [40]. If the order information is not kept locally in the CCS, the CCS will activate the order communications module [41] which will in turn communicate with the external merchant/supplier database [42]. Once the external database has determined that the goods or services are available, it communicates with the CCS order communications module notifying the CCS that the order has been accepted or not [44]. Such information is subsequently provided to the order acceptance process of the CCS (FIG. 6).

If the order data processing of the CCS determines that the product or service is represented in the CCS internal database of products and services [43], the CCS determines if the product of service is available in the desired quantity and/or at the desired time. The CCS verifies that inventory is present at the merchant/supplier, verifies the price of the goods or services desired, calculates the applicable tax, and confirms the delivery date and time desired. If the order information can be so fulfilled according to the database, the order accepted. If the database indicates the order cannot be satisfied it is rejected [44] and such information (acceptance or rejection) is communicated to the order acceptance process of the CCS (FIG. 6).

Figure 5:
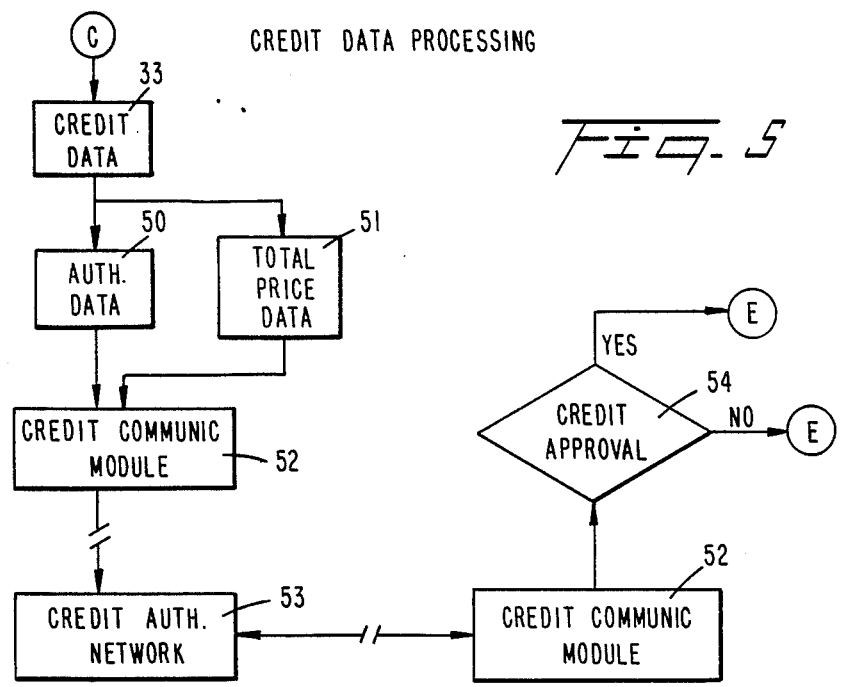

Referring to FIG. 5, credit data that is separated during the order packet process is sent to the credit processing software of the CCS. The credit data [33]

containing the information on the consumer, the type of credit card in use, the credit limits of the card (collectively the authorization data [50]), and the total purchase price [51] are divided into the data format necessary to communicate with the external credit database in question. The CCS credit communication module [52] allows this interaction with the external credit authorization network [53] to take place.

Once the external credit authorization network has reviewed the authorization and total price data, it communicates its determination back to the CCS via the credit communications module [52]. The CCS credit data processing software takes the incoming credit data and determines if the credit for the individual in question has been approved [54]. The results of this credit approval process are communicated to the CCS order acceptance process (FIG. 6).

Referring next to FIG. 6, the CCS order acceptance process makes two determinations. First, the CCS determines if products/services are available [60]. If not, the order is rejected [62] and the CCS so communicates to the OCT via the OCT communications module [30].

If the product or service is available, the CCS determines if credit for the purchase has been approved. If credit has not been approved, the order is rejected [62] and the rejection is communicated to the OCT via the OCT communications nodule [30]. If credit has been approved, the CCS proceeds to the order acceptance sequence [63] and communicates the order acceptance and confirming information to the OCT via the OCT communications module [30].

Because the CCS contains internal databases of products and services, it also performs an inventory management service to those merchants who subscribe to the automated order and payment system. Thus an added capability of the invention is to provide merchants with inventory reports concerning their goods shipped and on hand as well as other inventory control features.

In summary, this process selects the merchant/supplier, confirms the availability of inventory to fulfill the sale, confirms the price, method of payment, and credit status of the consumer as well as the delivery date and method of delivery.

How To Use

When a consumer wants to place an order for products/services the consumer activates the OCT by pressing a function key on the OCT key pad. The consumer is then prompted through a series of steps that are displayed on the OCT display screen. These steps lead the consumer through the process required in order to complete an order. Referring to FIG. 7, these steps include but are not limited to the following:

1. Press the function key to activate the OCT [70].
2. The consumer is prompted to scan the optical reader over the company identification code printed or transmitted in the advertisement [71].
3. The consumer is next prompted to scan the optical reader over the product(s) identification code(s) listed in the advertisement and which the consumer desires to order [72].
4. The consumer is prompted to enter the form of payment using the payment input means of the terminal. For example the user is directed to pass a credit card through the magnetic stripe reader of the terminal [73].

It is important to note that step 4 is accomplished by the OCT reading such information from the credit card in use. Such information will be present in the magnetic stripe, optical storage media or microchip on the credit card in use. It is an objective of this invention to provide a means of reading all such credit cards.

5. The consumer is next prompted to enter data concerning the address to which the consumer wishes the goods to be shipped if different from that stored on the credit card in use. This information is entered via the alphanumeric key pad of the OCT [74].
6. When this order entry process is completed, the consumer activates the communication capability of the OCT by causing the OCT to be connected to a telephone system or other transmission medium and depressing a "send" key [75]. At this point the OCT will dial a preprogrammed telephone number and transmit the order to the CCS. The information containing the order or orders, payment method, shipping addresses, and preferred method of delivery for each order (the order packet) is then processed by the CCS.
7. The CCS, via its internal software, accepts the order packet data [76], divides the data into order data [77] and credit data [78] performs the necessary analysis and communications to accept or reject the order [79], communicates the results to the OCT in question [80].
8. Once the order acceptance is communicated to the OCT, the consumer has a final opportunity to place the order or reject it [81] by so notifying the CCS via the OCT keypad input.
9. If the order is accepted by the consumer, it is placed by the CCS [82].
10. Once the order is placed, it is subsequently delivered to the consumer, or is filled for consumer pick-up on the date and at the time desired.

How to Use when Visually and/or Mobility-Handicapped

When a handicapped consumer wants to place an order for products/services, the consumer performs the following actions:

1. Activate the OCT by speaking an appropriate command into the OCT microphone [70].
2. The consumer is prompted by the OCT voice synthesizer to orally enter the company name that has been obtained from the advertising source that has been modified for use by the handicapped [71]. (e.g., Braille imprinting).
3. The consumer is prompted by the OCT voice synthesizer to orally enter the products/services and the price of those products and services desired [72].
4. The consumer is prompted by the OCT voice synthesizer to orally enter the form of payment using the payment input means of the OCT. For example, the user is prompted to pass a credit card through the magnetic stripe reader of the OCT [73]. If the consumer is unable to perform this task because of a particular handicap, the consumer will use the voice input means of the OCT to describe the payment method. Any special payments arrangements can be programmed into the OCT memory during the installation process.

The remaining operations of the product ordering and approval process proceed in the same fashion as previously described. Input and output during the ordering process can be achieved with any of the above described input or output sources (i.e. printer, voice synthesizer, alphanumeric display).

While a specific embodiment of the invention has been discussed in the preceding sections, the invention should be viewed broadly and limited only by the scope of the appended claims.

What is claimed is:

1. An automated order and payment system which comprises:
   A remote programmable data input/output means adapted to optically scan identification code information, and further adapted to accept credit card information obtained from the stored information on credit cards;
   A communication means integral to said remote programmable data input/output means;
   A memory means integral to such remote programmable data input/output and communication means that allows the storage of computer programs and information derived from printed or transmitted identification code information that has been optically scanned;
   A central data processing means with communications capability adapted to receive information from a plurality of remote programmable data input/output means; and
   Additional communication means allowing the remote data processing means to communicate with external data bases for credit authorization and product/service ordering purposes.

2. An automated order and payment system according to claim 1 wherein said remote data input/output means contains an optical reader for optically sensing identification codes, an alphanumeric key pad for data input, a communications interface to a central computer system which is an integral part of the automated order and payment system.

3. An automated order and payment system according to claim 2 wherein said remote programmable data input output device contains a magnetic reader to allow input of credit information from the magnetic stripe on credit cards.

4. An automated order and payment system according to claim 2 wherein said remote programmable data input output device contains a microchip reader to allow input of credit information from the microchips embedded in credit cards.

5. An automated order and payment system according to claim 2 wherein said remote programmable data input output device contains a laser optical data reader to allow input of credit information that is optically stored on credit cards.

6. An automated order and payment system according to claim 2 wherein said remote programmable input output device allows data entry via a speech processing means that allows oral instructions to be stored and used as digital data input.

7. An automated order and payment system according to claim 2 which comprises a central computer system which communicates with multiple remote programmable data input/output means over a plurality of transmission media.

8. An automated order and payment system according to claim 2 which receives information from the remote programmable data input/output means which data relates to company identification and product/service identification for subsequent processing of orders for such products or services.

9. An automated order and payment system according to claim 2 which comprises a remote programmable data input/output means and central computer system which receives information concerning orders for goods and services and which also receives information concerning payment for such goods and services by means of credit and which central computer system obtains information from credit data bases concerning the credit worthiness of consumers ordering the products and services in question.

10. An automated order and payment system according to claim 9 which contains a data base of merchant/suppliers of products and services from which information is extracted concerning the availability of products and services that a consumer desires to order.

11. An automated order and payment system according to claim 10 which interacts with a consumer to notify the consumer of the acceptance or rejection of an order, or part of an order, based upon the approval/disapproval of credit and/or the availability/non-availability of the products or services desired.

12. A programmable remote order computer terminal ("OCT") comprising;
    A remote programmable data input/output means adapted to optically scan identification code information, and further adapted to accept credit card information obtained from the stored information on credit cards;
    A communication means integral to said remote programmable data input/output means;
    A memory means integral to such remote programmable data input/output and communication means that allows the storage of computer programs and information derived printed or transmitted identification code information that has been optically scanned.

13. A process for rapidly ordering and paying for goods and services comprising;
    The optical input by a consumer of a printed or transmitted identification codes used to identify merchants and goods/services desired by the consumer,
    The entry of credit and consumer data by reading such information from a plurality of storage means resident on credit cards,
    The storage and subsequent transmission of such data to a central computer systems,
    The separate processing of such data by the central computer systems to determine (1) the availability of the product or service desired, and (2) the credit worthiness of the consumer ordering the products or services
    The notification to the consumer of the approval or rejection of the sale desired
    The delivery of the goods or products ordered by the consumer by prearranged parameters or selectively designated by the consumer at the time of sale.

14. A process for automated ordering of products and/or services according to claim 13 wherein the consumer and credit information is derived from a microchip credit card, magnetic storage credit card and/or optical data storage credit card.

* * * * *

REEXAMINATION CERTIFICATE (2037th)

United States Patent [19]

Gorog

[11] B1 4,947,028

[45] Certificate Issued Jun. 8, 1993

[54] AUTOMATED ORDER AND PAYMENT SYSTEM

[75] Inventor: Jonathan M. Gorog, Falls Church, Va.

[73] Assignee: U.S. Order, Incorporated, Herndon, Va.

Reexamination Request:
No. 90/002,536, Dec. 6, 1991

Reexamination Certificate for:
Patent No.: 4,947,028
Issued: Aug. 7, 1990
Appl. No.: 221,536
Filed: Jul. 19, 1988

[51] Int. Cl.[5] .............................................. G06F 7/08
[52] U.S. Cl. ................... 235/381; 235/380; 235/383; 235/472; 364/408
[58] Field of Search ............... 235/380, 381, 383, 472; 902/22; 364/408

[56] References Cited

U.S. PATENT DOCUMENTS

| | | |
|---|---|---|
| 3,292,489 | 7/1964 | Johnson et al. |
| 3,668,312 | 6/1972 | Yamamoto et al. |
| 3,719,927 | 3/1973 | Michels et al. |
| 4,115,870 | 9/1978 | Lowell |
| 4,266,271 | 5/1981 | Chamoff et al. |
| 4,277,837 | 7/1981 | Stuckert |
| 4,329,684 | 5/1982 | Monteath et al. |
| 4,341,951 | 7/1982 | Benton |
| 4,361,851 | 11/1982 | Asip et al. |
| 4,415,065 | 11/1983 | Sandstedt |
| 4,460,965 | 7/1984 | Trehn et al. |
| 4,471,218 | 9/1984 | Culp |
| 4,511,970 | 4/1985 | Okano et al. |
| 4,516,016 | 5/1985 | Kodron |
| 4,525,624 | 7/1985 | Pontefract |
| 4,578,572 | 3/1986 | Hice |
| 4,608,487 | 8/1986 | Awane et al. |
| 4,621,189 | 11/1986 | Kumar et al. |
| 4,621,259 | 11/1986 | Schepers et al. |
| 4,707,592 | 11/1987 | Ware |
| 4,734,858 | 3/1988 | Schlafly ........................ 364/408 |
| 4,752,676 | 6/1988 | Leonard et al. |
| 4,812,628 | 3/1989 | Boston et al. |
| 4,812,629 | 3/1989 | O'Neil et al. |

*Primary Examiner*—Harold Pitts

[57] ABSTRACT

An automated order and payment system for use by consumers to rapidly order products and services from any location at which the consumer is present at the time of ordering. The system receives information about the products/services to be ordered by means of signals generated by scanning identification codes imprinted in advertising media or displayed to a consumer on a television screen. A special version of the invention is modified to accept voice command via a voice recognition means for those physically handicapped persons unable to perform manual data entry tasks. The consumer uses an optical scanning means embodied in the Order Computer Terminal to scan identification code associated with a company and identification codes associated with the products/services desired. This product and company information is stored in the Order Computer Terminal along with credit information retrieved from a plurality of storage means used on credit cards and subsequently transmitted when desired by the consumer to a Central Computer System. The Central Computer System simultaneously receives information from multiple order computer terminals and verifies that the products or services from the desired company are in fact available. The Central Computer System also verifies the credit worthiness of the consumer by searching for such information from credit data bases. When the Central Computer System determines that the desired products/services are available and that the consumer is credit worthy, an order verification signal is sent to the individual consumer's order computer terminal whereupon the consumer verifies that he/she wishes to order the products/services communicated to the central computer system. Once the consumer varifies the order, the automated order and payment systme places the order for the products/services desired and provides the appropriate credit reference to the supplier of the product/service. The automated order and payment system capabilities are more fully set forth herein.

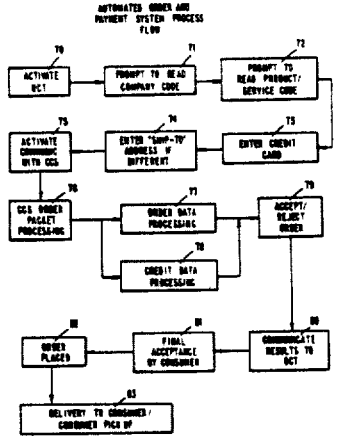

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 8, 9 and 12 are cancelled.

Claims 1, 3-7, 10-11, 13 and 14 are determined to be patentable as amended.

1. An automated order and payment system which comprises:
   [A] *a plurality of* remote programmable data input-/output [means adapted to optically scan identification code information, and further adapted to accept credit card information obtained from the stored information on credit cards; *terminals, and a central data processor, each one of said plurality of remote terminals comprising:*
   [A communication means integral to said remote programmable data input/output means;
   A memory means integral to such remote programmable data input/output and communication means that allows the storage of computer programs and information derived from printed or transmitted identification code information that has been optically scanned;
   A central data processing means with communications capability adapted to receive information from a plurality of remote programmable data input/output means; and
   Additional communication means allowing the remote data processing means to communicate with external data bases for credit authorization and product/service ordering purposes]
   *an optical reader for optically scanning and producing first data representative of visually displayed product or service identification code information;*
   *a payment card reader for inputting payment card information stored on any one of a plurality of user's different payment cards, including means for producing second data representative of such payment card information;*
   *integral memory means for temporarily storing the first data representative of the optically scanned identification code information and the second data representative of the payment card information; and*
   *integral communication means for transmitting the first and second data to said central data processor, subsequent to storage of the first and second data in the integral memory means; and*
   *additional integral memory means for storing computer programs for controlling operation of at least the optical reader, the payment card reader, the integral memory means and the integral communication means;*
   *said central data processor comprising:*
   *first central communications means for receiving the transmission of first and second data from the integral communication means of the remote terminals;*
   *order pricing means for calculating an order cost to the user based upon at least the first data received from the remote terminals by the first central communications means;*
   *second central communication means for transmitting the second data and order cost to an external database, and for receiving payment authorization information therefrom;*
   *order confirmation means for providing to the remote terminal, subsequent to receipt of the payment authorization from the external database, a request for the user's confirmation that a product or service represented by the first data should be ordered; and*
   *third central communication means for transmitting at least the first data and the payment authorization information to a product/service provider in accordance with the first data, in response to receipt by the central data processor of an order confirmation message from the remote terminal.*

3. [An] *The* automated order and payment system according to claim [2] *1* wherein [said] *the payment card reader of at least one* remote programmable data input output [device contains] *terminal comprises* a magnetic reader [to allow input of credit] *for reading* information from [the] magnetic [stripe] *stripes* on [credit] *payment* cards.

4. [An] *The* automated order and payment system according to claim [2] *1* wherein [said] *the payment card reader of at least one* remote programmable data [input output device contains] *input/output terminal comprises* a microchip reader [to allow input of credit] *for reading* information from [the] microchips embedded in [credit] *payment* cards.

5. [An] *The* automated order and payment system according to claim [2] *1* wherein [said] *the payment card reader of at least one* remote programmable data [input output device contains] *input/output terminal comprises* a laser optical data reader [to allow input of credit] *for reading* information that is optically stored on [credit] *payment* cards.

6. [An] *The* automated order and payment system according to claim [2] *1* wherein [said] *the payment card reader of at least one* remote programmable [input output device allows data entry via a] *data input/output terminal comprises* speech processing means [that allows] *for causing* oral instructions to be stored and used as [digital] *at least one of the first and second data* [input].

7. [An] *The* automated order and payment system according to claim [2 which comprises a central computer system which] *1 wherein the first central communication means* communicates with multiple remote programmable data input/output [means] *terminals* over a plurality of transmission media.

10. [An] *The* automated order and payment system according to claim [9 which contains] *1, the central data processor further including* a data base of [merchant/suppliers] information concerning availability of products and services from [which information is extracted concerning the availability] *merchant/suppliers* of *said* products and services [that a consumer desires to order].

11. [An] *The* automated order and payment system according to claim 10 [which interacts with a consumer to notify the consumer of the acceptance or], *the central data processor further including means for providing a message to a remote terminal indicating* rejection of an order, or part of an order, based upon [the approval/disapproval of credit and/or the] availability/non-availability of the products or services [desired] *corresponding to the first data.*

13. A process for rapidly ordering and paying for goods and services comprising:

[The optical input by a consumer of a printed or transmitted identification codes used to identify merchants and goods/services desired by the consumer, The entry of credit and consumer data by reading such information from a plurality of storage means resident on credit cards, The storage and subsequent transmission of such data to a central computer systems, The separate processing of such data by the central computer systems to determine (1) the availability of the product or service desired, and (2) the credit worthiness of the consumer ordering the products or services The notification to the consumer of the approval or rejection of the sale desired The delivery of the goods or products ordered by the consumer by prearranged parameters or selectively designated by the consumer at the time of sale]

*a consumer's optically inputting product or service identification codes used to identify merchants and goods/services desired to be purchased by the consumer, into memory of a remote programmable data input/output terminal,*

*the consumer's entering of payment data into said memory by placing a payment card into a payment card reader integral with the remote terminal,*

*subsequently transmitting said identification codes and payment data to a central data processor,*

*verifying by the central data processor that the product or services corresponding to the identification codes are available;*

*transmitting the payment data from the central data processor to an external database associated with the payment data;*

*the central data processor's receiving payment authorization data from the external database;*

*notifying the consumer of availability of and payment authorization for, or rejection of, the desired purchase, and*

*upon order confirmation by the consumer, delivery of the goods or services ordered to the consumer by prearranged parameters or selectively designated by the consumer at the time of sale.*

14. [A] *The* process for automated ordering of products and/or services according to claim 13 wherein the [consumer and credit information is] *payment data are* derived from a microchip [credit] *payment* card, magnetic storage [credit] *payment* card and/or optical data storage [credit] *payment* card.

* * * * *